United States Patent [19]

Bias

[11] Patent Number: 5,082,409

[45] Date of Patent: Jan. 21, 1992

[54] VEHICULAR LUG NUT COVER AND CLIP

[75] Inventor: Donald R. Bias, Columbia Station, Ohio

[73] Assignee: Aluminum Company of America, Pittsburgh, Pa.

[21] Appl. No.: 603,421

[22] Filed: Oct. 26, 1990

[51] Int. Cl.$^5$ .................................................. F16B 37/14
[52] U.S. Cl. ..................................... 411/431; 411/371
[58] Field of Search ............... 411/429, 430, 431, 371, 411/372, 373, 377, 910, 918

[56] References Cited

U.S. PATENT DOCUMENTS

| | | | |
|---|---|---|---|
| 2,103,743 | 12/1937 | Doty | 411/429 X |
| 3,485,134 | 12/1969 | Ott | 411/372 |
| 4,659,273 | 4/1987 | Dudley | 411/373 |
| 4,890,967 | 1/1990 | Rosenbaum | 411/431 |

FOREIGN PATENT DOCUMENTS

| | | | |
|---|---|---|---|
| 804736 | 4/1951 | Fed. Rep. of Germany | 411/373 |
| 2595125 | 9/1987 | France | 411/373 |
| 23512 | 2/1913 | United Kingdom | 411/373 |
| 1536598 | 12/1978 | United Kingdom | 411/371 |

Primary Examiner—Rodney M. Lindsey
Attorney, Agent, or Firm—Gary P. Topolosky

[57] ABSTRACT

A cover for a bolt and an annular nut having a plurality of generally planar, side surfaces comprises a shell including a closed end portion and a plurality of side surfaces extending downwardly from the closed end portion. Each side surface of the shell has a generally planar inner wall that terminates in the bottom wall adapted for adjoining a flat surface of the wheel rim mounted on a vehicle with a plurality of such bolts and nuts. The cover further comprises a clip for inserting into the cavity defined by the shell side surfaces. This clip includes an annular ring and a plurality of spaced projections extending downwardly from the ring's perimeter, each projection adapted for engaging a side surface of the annular nut when the cover is installed thereover. The cover further comprises means for retaining the clip within the shell cavity. Preferred retaining means include: at least one inward protrusion from each inner wall against which a clip projection end section will engage when the clip is inserted into the cavity; and at least one pair of ring locators extending inwardly and axially along opposing inner walls of the shell. On a preferred basis, this outer shell is made from chrome-plated plastic and the clip from a zinc-plated metal such as steel, brass or aluminum.

28 Claims, 3 Drawing Sheets

VEHICULAR LUG NUT COVER AND CLIP

BACKGROUND OF THE INVENTION

1. Field of the Invention

This invention relates to vehicular wheel accessories. More particularly, the invention relates to a protective cap for covering the lug nut and bolt or stud for attaching a wheel rim to a car, truck, bus or the like. The invention further relates to a spring clip for inserting into a protective lug nut cover.

2. Technology Review

Numerous types of lug nut caps or covers have been developed over the years. Many caps are designed to prevent corrosion of the vehicular wheel parts which they cover. Other covers prevent unauthorized tampering with or removal of the lug nuts which secure a wheel rim on a vehicle. Still other covers serve a purely decorative or ornamental function.

In U.S. Pat. No. 2,018,301, there is shown a domed cap made from rustproof metal. The base of this cap includes an inwardly extending flange for permanently securing onto a vehicular lug nut during final die forming. U.S. Pat. No. 2,095,289 shows a lug nut cap having a base portion which seats flush with the top of a nut secured on a threaded bolt. The domed body of this cap covers only that section of bolt protruding outwardly beyond the nut. The domed body includes prongs, or a separate clip, for engaging the threads of the bolt section covered by this cap. In U.S. Pat. No. 3,135,558, there is claimed a unitary wheel cover comprised of five unthreaded cap members disposed in a circular array with spring-like means connecting adjacent cap members. The capped wheel nut of U.S. Pat. No. 3,364,806 includes a conical base for seating in a depression on the axle hub of an automobile. The wheel nut, itself, is permanently encased in its own corrosion-resistant cover.

U.S. Pat. No. 3,548,704 shows a protective cap having a closed end with inwardly projecting ribs for engaging the threads of a bolt or stud. These ribs prevent dislodging of the cap by axial movement. In U.S. Pat. No. 4,582,462, there is claimed a plastic cap for protecting a polygonal lug nut assembly. The inner face of this cap includes two sets of axial profile webs, one set adapted for sliding the cap over a hexagonal nut during installation; the other set adapted for frictionally locking the cap onto its hexagonal nut.

In U.S. Pat. No. 4,632,465, there is shown a plurality of knob fittings for covering nuts of a hub cap mounted on the recessed, drive axle wheels of a truck or bus. These knob fittings snap mount directly over the lug nuts which they cover. U.S. Pat. No. 4,659,273 claims an attachment for detecting removal of the wheel nut covered by this attachment. An internally-threaded member secures an outer shroud of this attachment to a vehicular bolt or stud. The capped wheel nut of U.S. Pat. No. 4,764,070 secures to the outside of a vehicular lug nut using silicon-based adhesives. Such adhesion avoids the corrosion that occurs at the weld points of prior lug nut assemblies.

U.S Pat. No. 4,775,272 shows a representative "long style" wheel nut cap. The sheet metal exterior of this cap welds to the lower edge of a hexagonal nut for preventing moisture from entering the cap. The protective nut cap of U.S. Pat. No. 4,784,555 includes a radially-disposed, continuous groove along the lower edge of its inner surface. An elastomeric member, or O-ring, rests in this groove for engaging the angled points of the lug nut covered thereby. The locking nut cover of U.S. Pat. No. 4,824,305 includes a stainless steel outer shell, a hexagonal head portion with a plurality of square lugs extending inwardly from this head portion, a smaller, integrally-formed cylindrical portion, and a molded plastic insert with spaced depressions for receiving the hexagonal head portion.

SUMMARY OF THE INVENTION

It is a principal objective of this invention to provide a vehicular lug nut cover which can be easily installed and removed. The cover described herein needs no special tools, such as a hammer, to install over the lug nut secured on a threaded bolt or stud. Nor does this cover need any specific puller to remove it from the bolt and nut combination over which it is installed. The invention may be snap fitted over and removed from most any vehicular lug nut by hand.

It is another objective to provide a cover that fits snugly against the sides of any lug nut over which it is installed so as to not dislodge under normal driving conditions. To achieve a snug fit, the invention includes a spring-like clip having a plurality of projections, each of which makes multiple points of contact with, or engagement between, the inner walls to the cover's outer shell and the annular side surfaces of the lug nut over which the clip and cover are installed. Preferably, these multiple points of contact are not axially aligned so as to provide better engagement with, or compression between, adjacent shell and nut side surfaces.

It is yet another objective to provide a lug nut cover which requires no contact with the bolt, especially the bolt threads, over which the cover is installed. The securement means for this invention is not contingent upon gripping any portion of the bolt extending through the secured lug nut. In fact, the outer shell of this cover makes no direct contact with the lug nut over which it is installed. Only the spring-like clip of this invention is interposed between its outer shell and the lug nut covered thereby.

It is another principal objective of this invention to provide a cover which seats flush with a generally flat surface of the wheel rim when installed. Such flush contacting inhibits dirt, road salt and other elements from getting beneath the cover and rendering the bolt and lug nut therebeneath more susceptible to corrosion or other damage. Once installed, the invention completely covers the bolt hole extending through the wheel rim for reducing the possibility of exposing any of the brake, steering and other wheel assembly parts over which the vehicular rim is mounted.

It is yet another objective to provide a lug nut cover which includes a chrome-plated plastic, outer shell. The configuration of this shell is designed for easy manufacture through known injection molding processes. With an outer plating of chrome applied to this shell, wheel accessory maintenance has been simplified. Past lug nut covers made of aluminum, steel or other metals required periodic polishings to maintain their luster. In some instances, these covers had to be fully removed for cleaning and/or polishing. Because some prior art caps required special tools for installation and/or removal, general maintenance was even more complicated. The chrome-plated shells of this invention, on the other hand, wash clean with soap and water. No special polishing procedures are needed. With a plastic underlayment, these shells are also less susceptible than their metal counterparts to minor dents and pings. The chrome-plated shells of this invention enhance the appearance of most forged aluminum alloy wheels, such as those used on light trucks, heavy load trucks and buses. These same shells also improve the aesthetics of steel wheel rims, painted or otherwise.

It is another objective of this invention to provide a metal clip for inserting into the shell of a removable lug nut cover, said clip being easily inserted a predetermined distance into the shell. This clip is preferably zinc-plated for enhancing its resistance to corrosion. It also contains a plurality of spring-like projections for snap fitting on and off the bolt and lug nut over which the cover of this invention is installed. Preferably, each clip projection is flanged to flare outwardly at its end section for added strength and rigidity. On a preferred basis, each clip projection contacts an inner wall of the plastic shell cover described above as well as an annular side surface of the lug nut covered hereby.

In accordance with the foregoing objectives and advantages, there is provided a cover for a bolt and an annular nut having a plurality of generally planar, side surfaces. The cover comprises a shell including a closed end portion and a plurality of side surfaces extending downwardly from the closed end portion, said side surfaces defining a generally hollow, cylindrical cavity. Each shell side surface has a generally planar inner wall that terminates in the bottom wall adapted for adjoining a flat surface of wheel rim when the cover is installed over a bolt and nut combination for mounting said rim on a vehicle. The cover further includes a clip for inserting into the aforementioned shell cavity. This clip includes an annular ring and a plurality of spaced projections extending downwardly from the ring, each projection adapted for engaging a side surface of the nut over which this cover is installed. The cover further includes means for retaining the clip in its shell cavity. Preferred clip retaining means include at least one inward protrusion from each inner wall against which a projection end section engages when the clip is inserted in the cavity; and at least one pair of ring locators extending inwardly and axially along opposing inner walls of the shell. On a preferred basis, the outer shell of this cover is made from a chrome-plated plastic while the clip made from a zinc-plated metal such as steel, brass or aluminum.

BRIEF DESCRIPTION OF THE DRAWINGS

Further features, other objectives and advantages of this invention will become clearer from the following detailed description of preferred embodiments made with reference to the drawings in which.

DETAILED DESCRIPTION OF PREFERRED EMBODIMENTS

Figure 1:
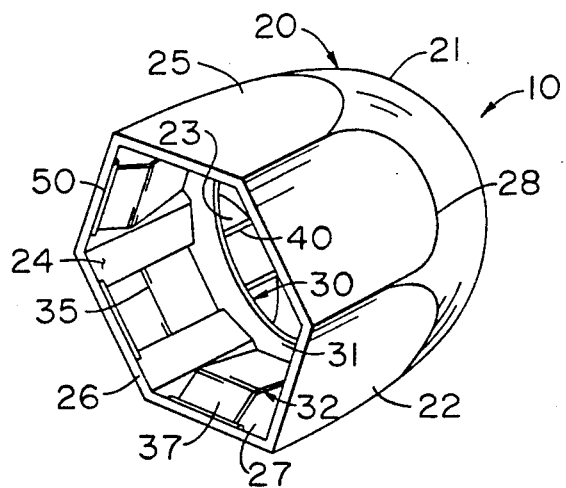
FIG. 1 is a perspective view of one lug nut cover embodiment with a clip in the shell portion of this cover.
Figure 2:
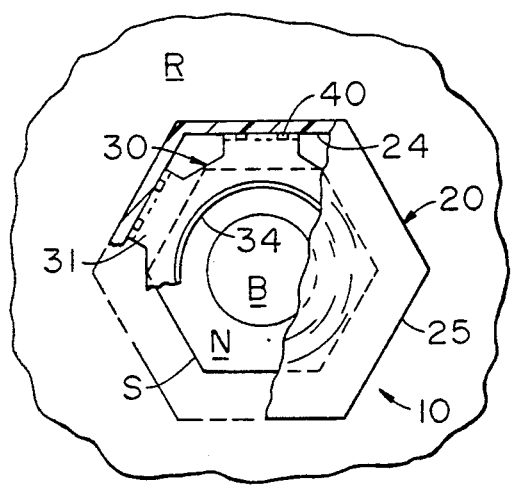
FIG. 2 is a top view of the FIG. 1 lug nut cover installed over a vehicular bolt and lug nut with portions of respective elements cut away.
Figure 3:
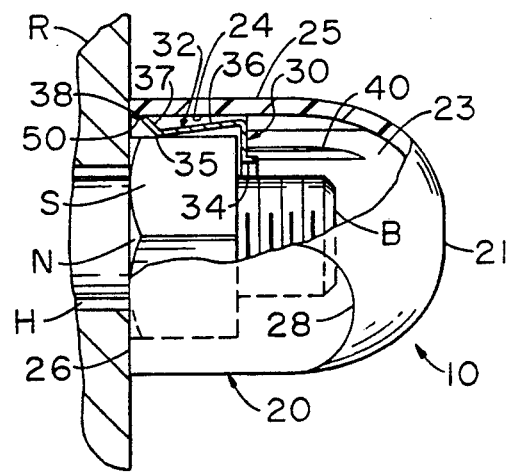
FIG. 3 is a side view of the lug nut cover from FIG. 2 with portions of respective elements cut away.

Referring to FIGS. 1-3, there is generally shown a lug nut cover 10 comprised of: an outer shell 20, a spring-like clip 30 for inserting into shell 20, and means for retaining clip 30 within outer shell 20. The cover of this invention typically installs over a threaded stud or bolt B and its correspondingly threaded annular nut N, said nut having a plurality of generally planar, side surfaces S.

When cover 10 is installed over a secured nut and bolt, as in FIG. 3, it is a principal objective that this invention substantially cover and minimize any exposure of the hole H in wheel rim R through which bolt B passes. In the accompanying FIGURES, shell 20 is generally six-sided for fitting over the type of hexagonal lug nuts used to secure a wheel rim on an automobile, truck or bus. This invention may also be easily modified to cover polygonal nuts which are other than six-sided. For example, an outer shell with four-sides could be constructed to cover a generally square nut. And an octagonal shell could be made to fit over an octagonal nut. Generally speaking, though, the cover of this invention is intended to have the same number of side surfaces as the number of side surfaces on the nut over which the cover is installed. The shell's side surfaces are also intended to be only slightly longer at their base than the length of each annular nut surface. Such an arrangement allows the inner walls of shell 20 to extend substantially parallel to, but not in contact with, the side surfaces of nut N when cover 10 is installed thereover.

Figure 4:
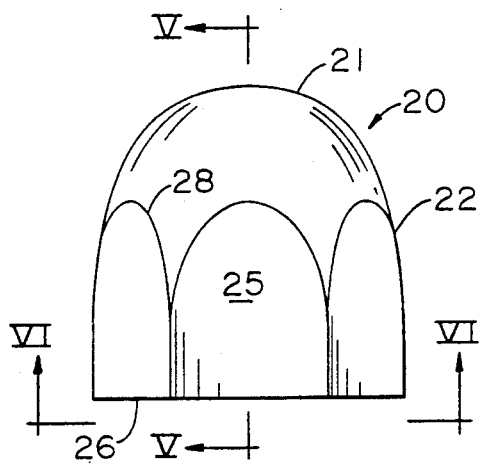
FIG. 4 is a front view of one embodiment of an outer shell according to the invention.
Figure 5A:
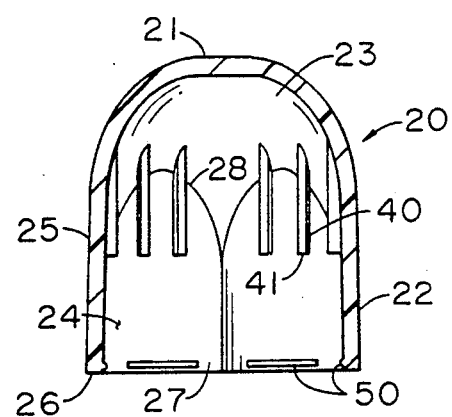
FIG. 5A is a sectional view taken along lines V—V of FIG. 4.
Figure 6:
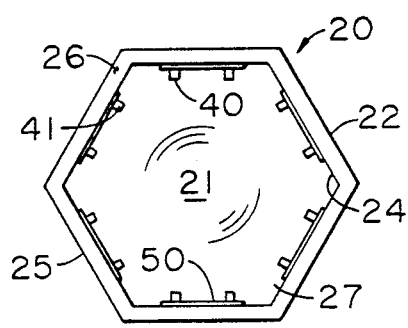
FIG. 6 is a bottom view of the shell taken along lines VI—VI of FIG. 4.

In FIGS. 4-6, several different configurations for shell 20 are shown. A first or main embodiment is depicted in front, sectional and bottom views in FIGS. 4, 5A and 6, respectively. Alternative means for retaining clip 30 within shell 20 are illustrated in FIGS. 5B through 5D. Each shell embodiment depicts several common elements. The elements in FIGS. 5B-5D that are common to FIG. 5A have been correspondingly numbered in the next hundred series as follows: 100 Series for FIG. 5B; 200 Series for FIG. 5C and 300 Series for FIG. 5D. Using the elemental numbering of FIG. 5A, each shell includes a closed end portion 21, which is preferably hemispherical or dome-shaped; and a plurality of side surfaces 22 extending downwardly from end portion 21. These side surfaces connect along adjacent lateral edges to define a hollow, generally cylindrical cavity 23. This cavity and the domed area beneath end portion 21 are designed to accommodate any portion of bolt B extending outwardly beyond the nut N secured thereon. The cover of this invention does not require any contact with the threads of bolt B, however.

Each side surface 22 of shell 20 has an inner wall 24 and outer wall 25. In the accompanying FIGURES, both inner walls 24 and outer walls 25 are generally planar. These same outer walls may be modified, with or without modification to end portion 21, to provide a cover which: is more bullet-shaped; has a somewhat spherical exterior; is cylindrical and flat-topped; or which is more customized in appearance.

Each shell inner wall 24 terminates in a base or bottom wall 26 to define an open shell end 27 opposite end portion 21. These bottom walls 26 are preferably planar so that they may seat flush against a flat surface of wheel rim R when the cover is installed over bolt B and nut N (as in FIG. 3). Opposite bottom wall 26, a nearly hemispherical arch 28 forms where each side surface 22 connects to a lower edge of end portion 21.

The first shell embodiment of FIG. 5A includes two types of clip retaining means: the first for keeping clip 30 from being inserted too deeply into shell 20 during cover assembly; and the other for preventing clip 30 from sliding along inner walls 24 and out of cavity 23 after clip 30 has been inserted into said cavity. In FIG. 5A, the first clip retaining means comprises a plurality of ring locators 40 extending inwardly from inner walls 24 and into shell cavity 23. As shown, a pair of thin, elongated locators 40 extend axially downwardly from each end portion 21 and across a portion of arch 28 before terminating in a lower ledge 41 intermediate arch 28 and bottom wall 26. Because the lower ledges 41 of each locator 40 terminate at a common point inwardly of cavity 23, clip 30 can only be inserted a predetermined distance into the cavity, i.e., until an annular ring portion described in detail hereinafter adjoins the lower locator ledges 41.

Figure 5B:
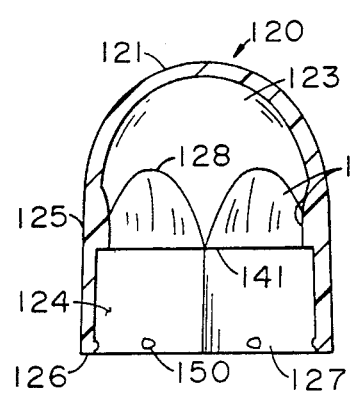
FIGS. 5B, 5C and 5D show cutaway views of alternative clip retaining means according to the invention.
Figure 5C:
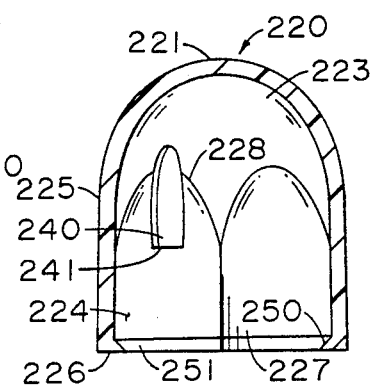
Figure 5D:
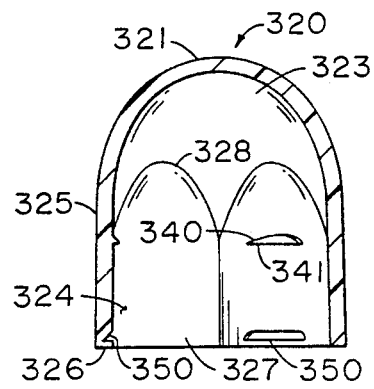

Alternate embodiments of first clip retaining means are shown in accompanying FIGS. 5B through 5D. Such embodiments may be more advantageous for a particular cover application depending upon the method in which shell 20 is manufactured. In FIG. 5B, the first clip retaining means comprises one ring locator 140 extending inwardly from and completely along the entire upper portion of each inner wall 124. Collectively, these locators 140 terminate in a common rim or lower ledge 141 that extends substantially parallel to the bottom walls 126 of shell 120. In FIG. 5B, the portion of ring locator extending downwardly to lower ledge 141 protrudes inwardly from arch 128. It is to be understood that this same ring locating feature may be accomplished with a single, thin ledge having no inward protrusion into cavity 123 extending downwardly to said ledge. The latter "ledge only" ring locator could complicate normal injection molding practices, however. In FIG. 5C, the ring locator means comprises at least one pair of locators 240 extending into cavity 23 from opposing inner walls 224 (only one shown) of shell 220. From this embodiment, it is clear that the general width of each locator 240 and number of locators per inner wall 224 are not critical to the present invention, provided the lower ledge 241 of each locator prevents clip 30 from being inserted too deeply into shell 220 during cover assembly. A third alternative ring locator means is depicted in FIG. 5D. Therein, said locator means comprises a protrusion 340 with a generally planar lower ledge 341, said protrusion extending only partially into alternating inner walls 324 of shell 320. This latter embodiment illustrates that the ring retaining means of this invention need not extend inwardly from end portion 321, or across arch 328 in order to accomplish its intended purpose.

The second clip retaining means of FIGS. 5A and 6 comprises a protrusion 50 from each inner wall 24 against which an end section of clip 30 engages when the clip is inserted into cavity 23. On a preferred basis, each protrusion 50 extends adjacent, or parallel to, the bottom wall 26 from which it inwardly protrudes. Such protrusions prevent the clip from sliding along the shell's inner walls and exiting the shell cavity 23. They also force each downward projection of clip 30, described in more detail hereafter, into frictional engagement with the inner wall 24 adjacent said projection. As a result, an end portion of each clip projection compresses inwardly for eventual engagement or frictional contact with the annular surfaces of the lug nut covered by this invention. In FIG. 5A, each protrusion comprises a planar bump that extends substantially parallel to the bottom wall but not across the entire width of said inner wall.

The alternate embodiment of protrusion 150 in FIG. 5B consists of a single, inwardly protruding bubble from each inner wall. It is to be understood, however, that multiple protrusions of this sort may be placed at or near the inner wall base against which a downward clip projection engages. Again, all features common with FIG. 5A in the alternative embodiments are correspondingly numbered in the next hundred series, i.e., 100 series for FIG. 5B, 200 series for FIG. 5C and 300 series for FIG. 5D.)

In FIG. 5C, yet another embodiment of clip retaining means is shown. Therein, a plurality of inwardly protruding rim portions 250 extend adjacent each bottom wall 226. Each rim portion is depicted with an inwardly slanting edge wall 251. Cumulatively, these edge walls extend around the entire perimeter of open end 227 to shell 220. The rim portions of this embodiment may also extend across only a portion of each inner wall 224 against which a clip projection engages. At a minimum, at least opposing inner walls or alternating inner walls, i.e., every other wall 224, should have clip retaining means. In yet another modification, rim portions, such as those in FIG. 5C, may protrude only partially inwardly from a plurality of inner wall bases with an edge wall sloped in the opposite direction of edge wall 251, or with an edge wall that is substantially parallel to bottom wall 226.

In FIG. 5D, yet another alternate clip retaining means comprises an indentation 350 into each inner wall against which a clip projection will engage. Like their inwardly protruding counterparts, such indentations prevent a clip projection end portion from sliding along the lower edges of inner wall 324 and exiting cavity 323. FIG. 5D also illustrates that every inner wall 324 need not include second clip retaining means. Such retaining means should only protrude inwardly or outwardly from those inner walls against which a clip projection end section will engage when the clip is inserted into shell cavity 323. Still other existing, or newly developed, clip retaining means may also be used in accordance with this invention.

Figure 7:
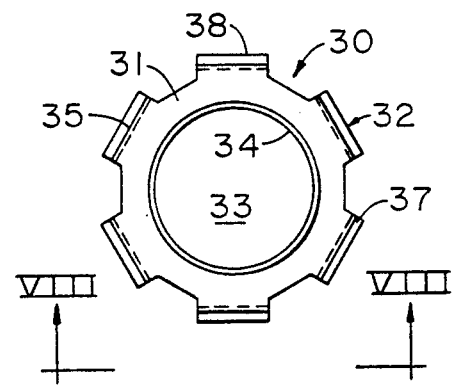
FIG. 7 is a top view of one embodiment of clip for inserting in the shell of this invention.
Figure 8A:
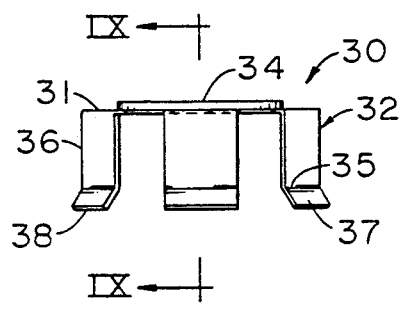
FIG. 8A is a front view of the FIG. 7 clip taken along lines VIII—VIII.
Figure 9:
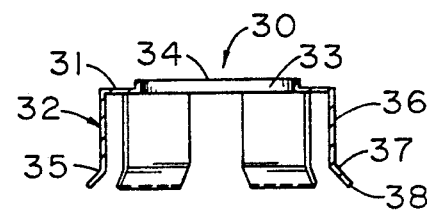
FIG. 9 is a sectional view taken along lines IX—IX of FIG. 8A.
Figure 8B:
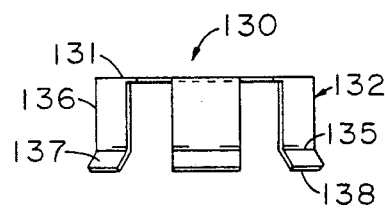
FIG. 8B is a front view of an alternative clip embodiment.

In FIGS. 7 through 9, the clip portion of this invention is shown in greater detail. Therein, clip 30 for inserting into cavity 23 of shell 20 comprises an annular ring 31 from which a plurality of projections 32 downwardly extend. Each of these projections engage a side surface of an annular nut when the cover is installed over nut N of FIG. 3. On a preferred basis, the annular ring is generally polygonal and has a central aperture 33 through which may pass that portion of bolt B extending outwardly beyond nut N. In FIGS. 8A and 9, central aperture 33 extends through a collared region 34 protruding upwardly from annular ring 31. The collared region provides rigidity to clip 30 so that its flatness or straightness is maintained. Ring 31 may also be made generally planar, with no equivalent to collared region 34 depending on the material selected for making clip 30. FIG. 8B shows an alternative clip 130 having no collared region extending therethrough. All other features in FIG. 8B that are common to FIG. 8A have been correspondingly numbered in the next hundred series.

The spring-like projections 32 that extend downwardly from annular ring 31 of FIG. 8A are the principal means by which cover 10 engages the side surfaces S of annular nut N. On a preferred basis, each projection includes a bend or flanged area 35 for dividing projection 32 into two portions: an upper region 36 that flares at least partially inwardly from the annular ring; and an outwardly flaring, end region 37. When clip 30 is inserted into shell 20, the lowermost edge 38 of end portion 37 engages with the second clip retaining means, typically an inward protrusion from inner wall 24, to seat clip 30 tightly within the cavity 23 of shell 20.

FIGS. 7 through 9 illustrate various embodiments of clips with six downward projections 32 from annular ring 31. It is to be understood, however, that a generally six-sided clip is not essential to this invention. On a preferred basis, clip 30 includes a downward projection 32 for each side surface S of the nut to be covered by the invention. At a minimum, however, clip 30 should include at least one pair of downward projections from opposing sides of the annular ring 31 or a downward projection for alternating inner walls of the shell into which the clip will be inserted.

Figure 11:
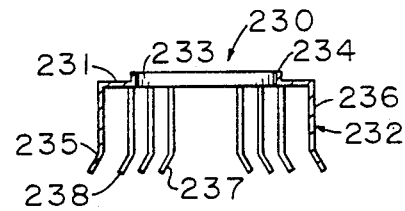
FIG. 11 is a sectional view taken along lines XI—XI of FIG. 10.
Figure 10:
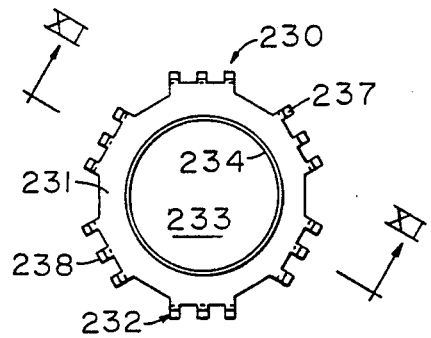
FIG. 10 is a top view of an alternative clip embodiment according to the invention.

In FIGS. 10 and 11, another alternate embodiment of clip 230 is shown with a plurality of finger-like projections 232 extending downwardly from the perimeter of annular ring 231. Like their FIG. 7 equivalents, these projections include an aperture 233, collared region 234, flanged area 235, inwardly flaring upper portion 236 and outwardly flaring end portion 237, each end portion terminating in a lowermost edge 238. Still other modifications to the spring-like projections of this clip are anticipated by this invention.

On a preferred basis, the shell portion of cover 10 is made from a virgin thermoplastic (i.e., not remelted), most preferably an acrylonitrile-butadiene-styrene (ABS) resin. One representative ABS resin for making shell 20 is sold by Borg-Warner under the trademark CYCOLAC ®. This material can be injection molded into the aforementioned shell configurations, provided the injection mold has only a few, and preferably no, horizontally extending ledges for inhibiting removal of a finished shell product from the mold. After injection molding has been completed, the entire exterior of plastic shell 20 is electroplated according to well-known copper-nickel-chromium type techniques. With such plating, the aesthetics of this plastic shell are improved while rendering the cover more resistant to dents and pings. A chrome-plated, plastic shell is also more easily cleaned to a fine luster than its all-metal counterparts. Road grime can be easily removed therefrom using soap and water, without any hand polishing.

The clip for inserting into shell 20 is preferably made from a material selected from aluminum, steel, brass, plastic and combinations thereof. It is conceivable, however, that both clip and shell of this invention could be made from plastic resins or metal-reinforced composites. Presently preferred embodiments employ a clip manufactured from an annealed aluminum alloy, such as the Aluminum Association's alloy 1050. Most preferably, the annular ring and downward projections of clip 30 are integrally formed of the same material. After stamping into the aforementioned shapes, this clip is zinc-plated for improving its resistance to corrosion.

Because of the general configuration of clip 30 and shell 20, preferred embodiments of this invention may not be made to fit universally over every vehicular lug nut. It is to be understood, however, that cover 10 may be made in various sizes, shapes and configurations to accommodate the lug nuts of numerous vehicles. Many of the covers depicted hereinabove install the 1½ inch hex head lug nuts used for mounting wheel rims on nearly all class 7 and 8 highway trucks, plus many more class 6 trucks and trailers, class A motor homes and commercial buses.

The covers of this invention may be sold fully assembled, that is, with the clips 30 inserted into the cavity 23 of shell 20 until the upper surface of annular ring 31 abuts the lower ledge 41 of each ring locator 40. They may also be sold as individual parts for subsequent assembly by the installer. When fully inserted, the lowermost edge 38 of each downward clip projection 32 snaps over and engages with the innermost side of each inward protrusion 50 from inner wall 24. Such insertions force the flanged area 35 of clip projection 32 into the cavity of shell 20. On a more preferred basis, each clip projection contacts the inner shell walls at or near where the upper edge of annular ring 31 contacts the lower ledge of ring locator 40. Such additional contact causes the downward projections of ring 31 to compress further inwardly for better contact with the side surfaces of the annular nut over which this cover is installed.

The cover of this invention may be hammered, by hand, over any nut and bolt combination until the bottom wall 26 of shell 20 abuts or adjoins a flat surface of the wheel rim mounted on a vehicle with a plurality of such nuts and bolts. During such installation, the inside to each downward projection flanged area 35 frictionally engages a side surface of the nut adjacent said flanged area. Such engagement causes each projection to move or compress inwardly against annular nut surface S and outwardly against the protrusion 50 holding clip 30 within shell 20. In this manner, cover 10 achieves multiple engagements with the lug nut over which it is installed, said engagements occurring at points which are not radially aligned. Rather, each clip projection exterior engages with the shell inner wall at a point axially apart from where its interior engages the annular nut surface. On a preferred basis, each projection 32 engages nut surface S radially inwardly from where its lowermost edge 38 contacts inner wall 24 adjacent protrusion 50. Although multiple contact points enable the invention to fit snugly over a bolt and lug nut combination, this cover may still be removed from said combination without special tools, typically by hand. Despite such easy installation and removal practices, the cover of this invention has been shown to remain affixed to the vehicular lug nut over which it is installed under normal driving conditions.

Having described the presently preferred embodiments, it is to be understood that the invention may be otherwise embodied within the scope of the appended claims.

What is claimed is:

1. A cover for a bolt and an annular nut having a plurality of generally planar side surfaces, said cover comprising:
   (a) a shell including: a closed end portion; and a plurality of side surfaces extending downwardly from the closed end portion for defining a generally hollow cavity, each side surface having a generally planar inner wall that terminates in a bottom wall adapted for adjoining a wheel rim when the cover is installed over the bolt and nut for mounting said rim on a vehicle;
   (b) a clip for inserting into the shell cavity, said clip including: an annular ring; and a plurality of spaced projections extending downwardly from the ring, each projection adapted for engaging a side surface of the nut when said cover is installed thereover; and
   (c) means for retaining the clip in the shell cavity, said clip retaining means including at least one element selected from the group comprising:
      (i) at least one inward protrusion from each inner wall against which an end section of the clip projection engages when the clip is inserted in the cavity; and
      (ii) a plurality of inwardly extending rim portions adjacent the bottom walls of the shell.

2. The cover of claim 1 wherein the closed end portion is substantially dome-shaped.

3. The cover of claim 1 wherein opposing pairs of projections extend downwardly from the ring.

4. The cover of claim 1 wherein each clip projection and screw flares peripherally outwardly.

5. The cover of claim 1 wherein each inner wall includes at least one inward protrusion adjacent the bottom wall.

6. The cover of claim 1 wherein an upper portion of each clip projection adjoins a side surface inner wall adjacent the closed end portion when the clip is inserted in the shell.

7. The cover of claim 1 wherein the clip includes a downward projection for each side surface of the nut.

8. The cover of claim 1 wherein the clip retaining means further includes at least one pair of ring locators extending into the shell cavity from opposing inner walls adjacent the closed end portion.

9. The cover of claim 8 wherein at least one ring locator extends inwardly and axially along an upper portion of each inner wall.

10. The cover of claim 8 wherein each ring locator extends generally parallel to the bottom walls of the shell.

11. The cover of claim 1 wherein the clip retaining means includes: at least one pair of inward protrusions from opposing inner walls; and at least one pair of ring locators extending inwardly and axially along opposing inner walls.

12. The cover of claim 1 wherein the shell is made from a chrome-plated plastic and the clip is made from a material selected from the group consisting of: aluminum, steel, brass and plastic.

13. A cover adapted for installing over a threaded bolt and an annular nut having a plurality of generally planar side surfaces, a plurality of such bolts and nuts being used for mounting a rim on a vehicular wheel assembly, said cover comprising:
   (a) a shell including:
      a generally dome-shaped end;
      a plurality of side surfaces extending downwardly from the dome-shaped end, each side surface having an inner wall that extends generally parallel to a side surface of the annular nut, said inner walls defining a shell cavity which terminates in a generally planar base adapted for abutting the rim mounted on the wheel assembly with such nuts and bolts; and
   (b) a metal clip adapted for inserting into the shell cavity, said clip including:
      an annular ring having an aperture through which a section of the bolt may pass when the cover is installed over said bolt and said annular nut, and
      at least one pair of projections extending downwardly from opposing sides of the ring, each projection adapted for frictionally engaging with:
         (i) an inner wall of the shell adjacent said downward projection when the clip is inserted into the shell cavity; and
         (ii) a side surface of the annular nut adjacent said downward projection when the cover is installed over said bolt and said annular nut;
      said shell further including:
         at least one ring locator extending inwardly and axially along an upper portion of opposing inner walls for preventing the clip from being inserted too deeply into the shell cavity; and
         at least one inward protrusion from opposing inner walls at or near the base to said inner walls, each protrusion adapted for preventing the downward projection adjacent said inner wall from exiting the shell cavity after its insertion into said cavity.

14. The cover of claim 13 wherein the clip includes at least one downward projection for each side surface of the annular nut, and wherein each inner wall includes at least one inward protrusion and one ring locator.

15. The cover of claim 13 wherein each clip projection is flanged to flare inwardly from the annular ring before terminating in an outwardly flared end section.

16. The cover of claim 13 wherein the shell is made from a chrome-plated plastic; and the clip is made from steel, brass or aluminum.

17. The cover of claim 13 wherein the annular ring and downward projections are integrally formed.

18. In combination with a bolt and a flat-sided lug nut for mounting a wheel rim on a vehicle, a removable cover comprising:
   (a) a plastic shell including:
      a generally dome-shaped end,
      a plurality of side surfaces extending downwardly from the dome-shaped end for defining a cavity, each side surface having an outer wall and a generally planar inner wall,
      a generally planar base opposite the dome-shaped end, said base adapted for abutting the wheel rim mounted with a plurality of bolts and lug nuts;
      at least one inward protrusion from each inner wall at or near the base adjacent said inner wall; and
      at least one locator that extends inwardly and axially from the dome-shaped end along an upper portion of each inner wall; and
   (b) a metal clip adapted for inserting into the shell cavity, said clip including:
      an annular ring having a central aperture from which downwardly extends at least one projection for each flat side of the lug nut over which the cover is installed, each projection adapted for frictionally engaging with:
(i) an inner wall of the shell adjacent said projection when the clip is inserted into the shell cavity, and
(ii) a flat side of the lug nut adjacent said projection when the cover is installed over said bolt and said lug nut.

19. The cover of claim 18 wherein each clip projection is flanged to flare inwardly from the annular ring before terminating in an outwardly flared end section.

20. The cover of claim 18 wherein each clip projection engages with the inner wall at an axial point apart from where it engages with the flat lug nut side.

21. The cover of claim 20 wherein each clip projection engages with the flat lug nut side radially inwardly from where it engages with the inner wall.

22. The cover of claim 18 wherein the plastic shell is chrome-plated.

23. A clip adapted for inserting a predetermined depth into a dome-shaped lug nut cover, said clip adapted for removably installing said dome-shaped cover over a threaded bolt and lug nut combination for mounting a wheel rim on a vehicle, said clip comprising:
an annular ring having a central aperture for accommodating a section of the threaded bolt extending outwardly beyond the lug nut secured on said bolt; and
a plurality of downwardly extending projections, each projection being flanged to flare inwardly from the annular ring before terminating in an outwardly flaring end region, each projection adapted for frictionally engaging with an inner wall of the lug nut cover adjacent said projection when the clip is inserted into said cover, and with a flat side of the lug nut adjacent said projection when the clip and dome-shaped cover are installed over said bolt and lug nut.

24. The clip of claim 23 wherein each clip projection engages with the inner wall at an axial point apart from where it engages with the flat lug nut side.

25. The clip of claim 23 wherein each clip projection engages with the flat lug nut side radially inwardly from where it engages with the inner wall.

26. The clip of claim 23 wherein the annular ring and downward projections are integrally formed.

27. The clip of claim 23 which includes a downward projection for each flat side of the lug nut covered by said dome-shaped cover.

28. The clip of claim 23 which is made from a material selected from the group consisting of: aluminum, steel, brass and plastic.

* * * * *